United States Patent
Watanabe et al.

(10) Patent No.: US 7,181,315 B2
(45) Date of Patent: Feb. 20, 2007

(54) MANUAL-MODE OPERATING SYSTEM FOR ROBOT

(75) Inventors: Atsushi Watanabe, Suginami-ku (JP); Tatsuya Oumi, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/959,434

(22) Filed: Oct. 7, 2004

(65) Prior Publication Data

US 2005/0080515 A1   Apr. 14, 2005

(30) Foreign Application Priority Data

Oct. 8, 2003  (JP) .............................. 2003-349905

(51) Int. Cl.
  *G05B 15/00* (2006.01)
  *G05B 19/00* (2006.01)

(52) U.S. Cl. .................. 700/264; 700/247; 700/248; 700/251; 700/257; 700/258; 700/259; 700/260; 700/261; 700/262; 700/245; 318/568.11; 318/568.12; 318/568.13; 318/568.16; 318/568.21; 318/568.25; 606/1; 606/102; 606/130; 606/139; 600/117; 600/118; 600/407; 600/426; 600/429; 600/587; 600/595; 901/1; 901/2; 901/27

(58) Field of Classification Search ............... 700/245, 700/186, 264
  See application file for complete search history.

(56) References Cited

U.S. PATENT DOCUMENTS

| | | | |
|---|---|---|---|
| 5,086,401 A * | 2/1992 | Glassman et al. | 700/259 |
| 6,356,806 B1 * | 3/2002 | Grob et al. | 700/245 |
| 6,728,599 B2 * | 4/2004 | Wright et al. | 700/258 |
| 6,785,593 B2 * | 8/2004 | Wang et al. | 700/258 |
| 6,788,999 B2 * | 9/2004 | Green | 700/275 |
| 6,799,088 B2 * | 9/2004 | Wang et al. | 700/258 |
| 6,836,703 B2 * | 12/2004 | Wang et al. | 700/258 |

(Continued)

OTHER PUBLICATIONS

Mack, Minimally invasive adn robotic surgery, 2001, Internet, p. 568-572.*

(Continued)

*Primary Examiner*—Thomas Black
*Assistant Examiner*—McDieunel Marc
(74) *Attorney, Agent, or Firm*—Drinker, Biddle & Reath LLP

(57) ABSTRACT

A manual-mode operating system for a robot provided with an end-effector. The manual-mode operating system includes a display section including a screen for displaying an image of an end-effector; a first input section for an input of coordinate system data on the screen of the display section, displaying the image of the end-effector, the coordinate system data designating a manual-mode coordinate system used for describing an orientation of the end-effector; a coordinate system setting section for setting the manual-mode coordinate system at a spatial position corresponding to an input position on the screen of the display section, based on the coordinate system data input through the first input section; a second input section for an input of orientation data using the manual-mode coordinate system set through the coordinate system setting section, the orientation data instructing the orientation of the end-effector; and an orientation adjusting section for adjusting the orientation of the end-effector, based on the orientation data input through the second input section.

13 Claims, 13 Drawing Sheets

U.S. PATENT DOCUMENTS

| | | | |
|---|---|---|---|
| 6,839,612 B2 * | 1/2005 | Sanchez et al. | 700/245 |
| 6,871,117 B2 * | 3/2005 | Wang et al. | 700/245 |
| 6,892,112 B2 * | 5/2005 | Wang et al. | 700/258 |
| 6,951,535 B2 * | 10/2005 | Ghodoussi et al. | 600/101 |
| 2004/0111183 A1 * | 6/2004 | Sutherland et al. | 700/245 |
| 2004/0138547 A1 * | 7/2004 | Wang et al. | 700/245 |
| 2004/0167668 A1 * | 8/2004 | Wang et al. | 700/248 |
| 2005/0021182 A1 * | 1/2005 | Wang et al. | 700/245 |
| 2005/0059960 A1 * | 3/2005 | Simaan et al. | 606/1 |

OTHER PUBLICATIONS

Tendick et al., Human-machine interfaces for minimally invasive surgery, 1997, IEEE, p. 1-6.*

Ikota et al., Hyper redundant miniature manipulator "Hyper Finger" for remote minimally invasive surgery in deep area, 2003, IEEE, p. 1098-1102.*

Stoianovici et al., Robotic tools for minimally invasive urologic surgery, 2002, Internet, p. 17.*

* cited by examiner

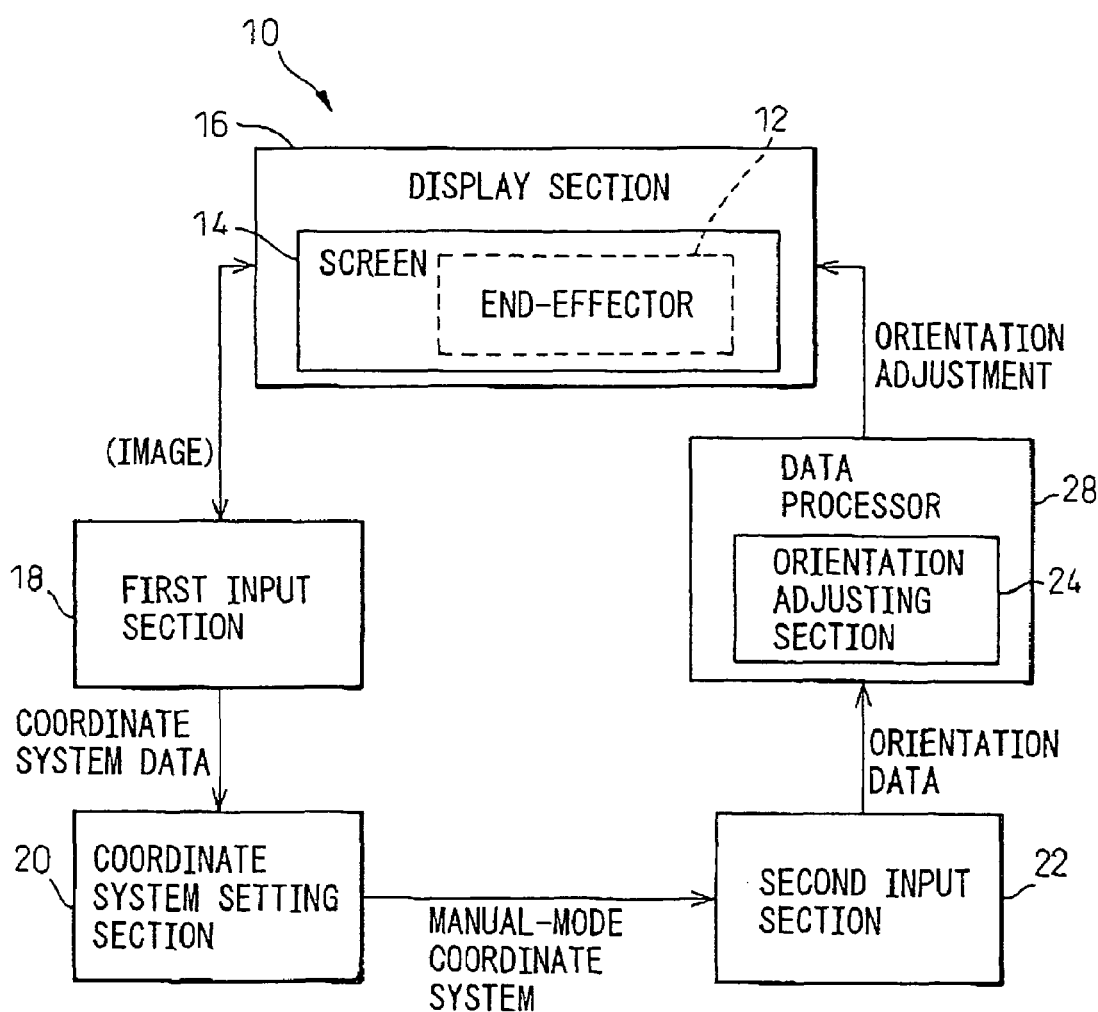

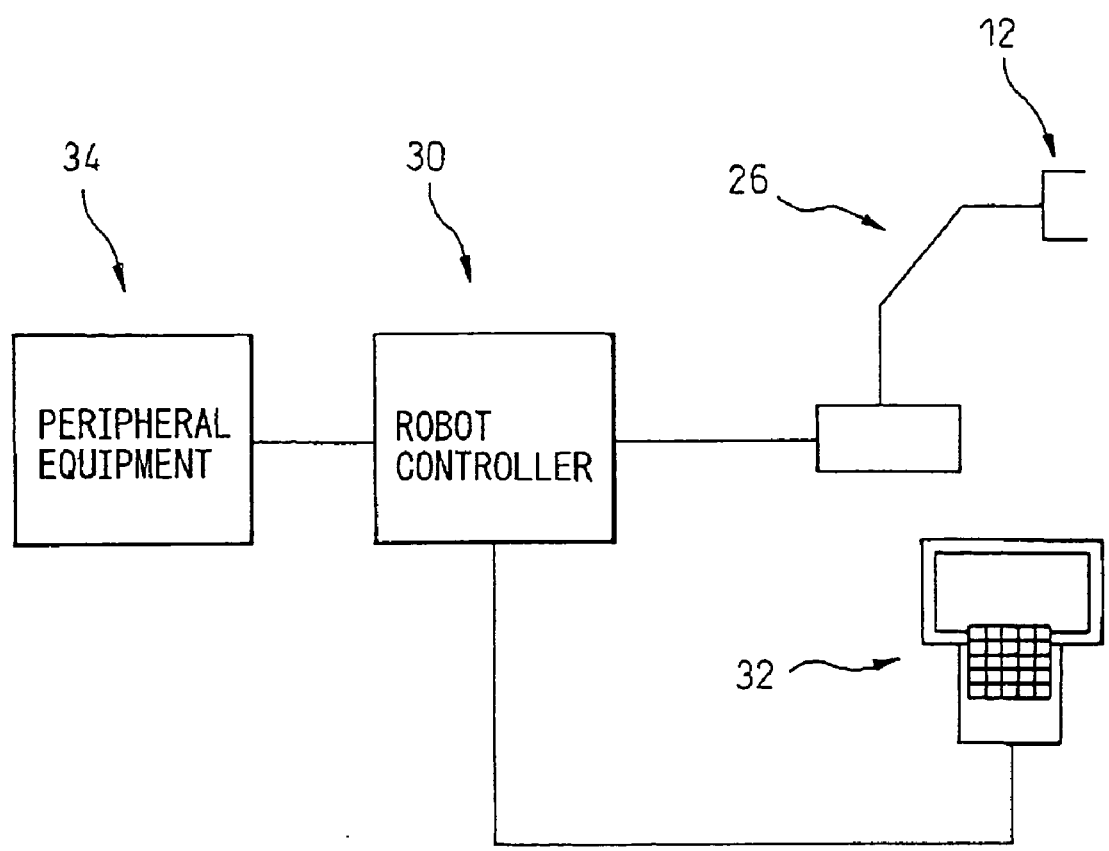

IMAGE IN +Z DIRECTION

IMAGE IN +X DIRECTION

MANUAL-MODE OPERATING SYSTEM FOR ROBOT

BACKGROUND OF THE INVENTION

1. Field of the Invention

The present invention relates, generally, to a manual-mode operating system for a robot.

2. Description of the Related Art

Generally, in an application wherein an end-effector is attached to a robot for working, it is practiced to adjust the orientation of the end-effector, in a manual mode, to teach a task that the end-effector should execute on an object (e.g., a workpiece) or for the optional changing of the orientation of the end-effector. For example, in a robot for handling, such as transferring, a workpiece (so called a handling robot), when teaching a manipulator, with a hand attached thereto, the task of picking up a workpiece placed on a workpiece support by the hand or the task of placing the workpiece gripped by the hand onto the workpiece support, it becomes necessary to change the orientation of the hand in various ways.

In the case where a manual mode operation is carried out, it is generally required that a coordinate system for describing the manual mode operation (referred to as "a manual-mode coordinate system" in this application) is designated to a robot controller, except for the case where a certain control axis provided in a manipulator is designated to have the manipulator carry out an act in association with the designated control axis. As for the orientation adjustment of the end-effector, the existing tool coordinate system, in which the tip end point of a tool (one of the end-effectors) is the origin, is often used as the manual-mode coordinate system to be designated, but there are also cases where a newly provided manual-mode coordinate system is designated. In order to set a new manual-mode coordinate system, techniques such the three-point teaching or the six-point teaching are used.

The manual-mode coordinate system in relation to the orientation adjustment of the end-effector is normally set on or near the end-effector, and, in the manual mode operation, the direction of rotation in a coordinate of the set manual-mode coordinate system is designated so as to change the orientation of the end-effector about the origin of the manual-mode coordinate system (or the tool end point in the case of the tool coordinate system) in the designated direction of rotation. In this connection, the manual-mode coordinate system is generally a rectangular three-axis coordinate system, and it is possible to perform the orientation change about the origin under a rotating motion about each coordinate axis of the manual-mode coordinate system by, for example, selecting either one of six keys (+X axis rotation, −X axis rotation, +Y axis rotation, −Y axis rotation, +Z axis rotation, −Z axis rotation) of a teaching unit provided for the robot and operating it for an input operation.

However, in the conventional procedure, if it is attempted to set the origin of the manual-mode coordinate system at a position desired as a center of the orientation adjustment of the end-effector, a setting condition cannot be visually confirmed, so that the manual mode operation should be repeated in a trial-and-error manner to select a most suitable coordinate system. This is somewhat complicated work requiring an operator's skill. Furthermore, even when the manual-mode coordinate system has been set successfully at a proper position, it is necessary to reset the manual-mode coordinate system if the working environment changes.

In view of this, another procedure may be adopted, in which the origins of a plurality of manual-mode coordinate systems are previously set at a plurality of positions on or near the end-effector and the most effective origin and the most effective manual-mode coordinate system are selectively used in correspondence to the change in the working environment of the robot to adjust the orientation of the end-effector in the manual mode. However, in this procedure, it is, in practice, difficult to set a large number of the origins of coordinates to correspond to all possible changes in the working environment, and also it becomes necessary to use many working steps to set the plural origins of coordinates, which is liable to increase the operator's load. These problems in the orientation adjusting motion for the end-effector are associated not only with the hand but also with various end-effectors other than the hand.

Similar problems may also arise in the case where, for a robot in an off-line programming system (so-called a simulation robot) rather than an actual robot, the orientation adjustment of the end-effector is carried out in a virtual three-dimensional simulation space as previously provided. In other words, when the orientation of the end-effector of the simulation robot is adjusted in a manual mode in the simulation space, no countermeasure has been taken to easily and properly set the manual-mode coordinate system, so that it has conventionally been difficult to efficiently implement proper off-line teaching by freely adjusting the orientation of the end-effector of the simulation robot.

SUMMARY OF THE INVENTION

It is an object of the present invention to provide a manual-mode operating system, for a robot, which is able to readily and accurately execute the adjustment of the orientation of an end-effector, without requiring an operator's skill, for an actual robot as well as for a simulation robot.

To accomplish the above object, the present invention provides a manual-mode operating system for a robot provided with an end-effector, comprising a display section including a screen for displaying an image of an end-effector; a first input section for an input of coordinate system data on the screen of the display section, displaying the image of the end-effector, the coordinate system data designating a manual-mode coordinate system used for describing an orientation of the end-effector; a coordinate system setting section for setting the manual-mode coordinate system at a spatial position corresponding to an input position on the screen of the display section, based on the coordinate system data input through the first input section; a second input section for an input of orientation data using the manual-mode coordinate system set through the coordinate system setting section, the orientation data instructing the orientation of the end-effector; and an orientation adjusting section for adjusting the orientation of the end-effector, based on the orientation data input through the second input section.

In the preferred aspect of the present invention, the above-described manual-mode operating system may comprise a robot mechanism including the end-effector, and the orientation adjusting section may control an actual motion of the robot mechanism in a manual mode, to adjust an actual orientation of the end-effector, based on the orientation data.

In this arrangement, the manual-mode operating system may comprise a robot controller for controlling a motion of the robot mechanism, and the orientation adjusting section may be provided in the robot controller.

Further, the coordinate system setting section may be provided in the robot controller.

Also, the manual-mode operating system may comprise a teaching unit connected to the orientation adjusting section, and the display section, the first input section and the second input section may be provided in the teaching unit.

In this arrangement, the coordinate system setting section may be provided in the teaching unit.

The manual-mode operating system may also comprise a data processor connected to the orientation adjusting section, and the coordinate system setting section may be provided in the data processor.

In the other preferred aspect of the present invention, the manual-mode operating system may comprise a data processor provided with the orientation adjusting section, and the orientation adjusting section may adjust the orientation of the end-effector represented as the image displayed on the screen of the display section, based on the orientation data.

The display section may display the manual-mode coordinate system, set through the coordinate system setting section, on the screen.

The display section may also display a shifting state of the end-effector during a period when the orientation is adjusted by the orientation adjusting section.

The manual-mode operating system may further comprise a storage section for storing working environment data including shape data of the end-effector, and the display section may acquire the working environment data from the storage section and display an image of a working environment including the image of the end-effector on the screen.

In the above manual-mode operating system, the coordinate system data, input through the first input section, may include origin coordinate data of the manual-mode coordinate system, and the coordinate system setting section may set the manual-mode coordinate system, including a coordinate axis parallel to a coordinate axis of another coordinate system previously set for describing position and orientation of the robot, based on the origin coordinate data input through the first input section.

Alternatively, the coordinate system data, input through the first input section, may include data of a geometrical image implying an input position on the screen of the display section, and the coordinate system setting section may set the manual-mode coordinate system so as to coincide with a coordinate system previously set in association with the geometrical image, based on the data of the geometrical image input through the first input section.

The end-effector may be provide with a movable portion and, when the coordinate system data designating the manual-mode coordinate system is input on an image of the movable portion displayed on the screen of the display section, the coordinate system setting section may change the coordinate system data in correspondence to an actual motion of the movable portion and set the manual-mode coordinate system, based on the coordinate system data as changed.

BRIEF DESCRIPTION OF THE DRAWINGS

The above and other objects, features and advantages of the present invention will become more apparent from the following description of preferred embodiments in connection with the accompanying drawings, wherein:

FIGS. 2A and 2B are block diagrams respectively showing preferred aspects of the manual-mode operating system according to the present invention;

FIG. 3 is an illustration typically showing a configuration of a manual-mode operating system according to one embodiment of the present invention;

DETAILED DESCRIPTION

Figure 1:
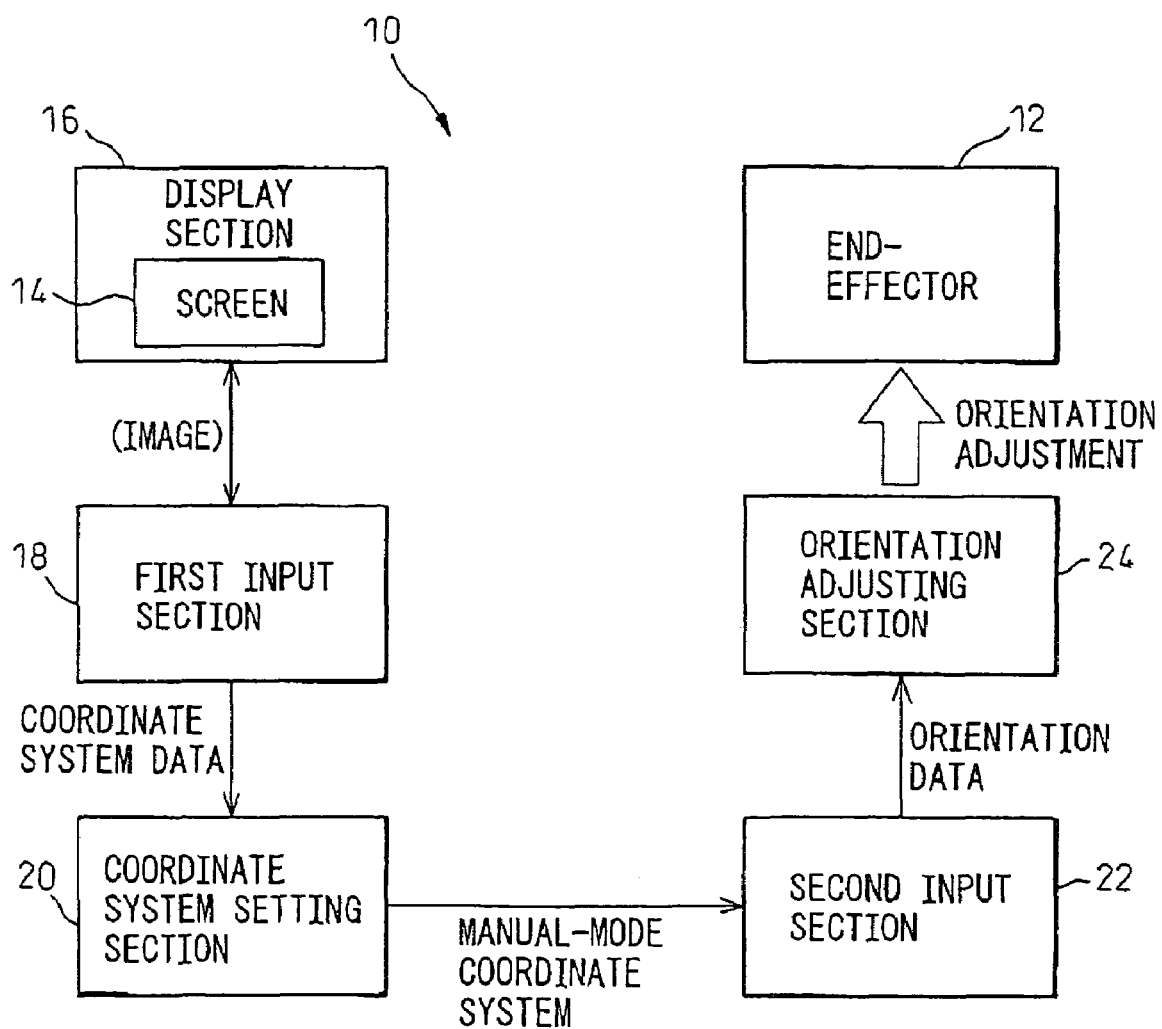
FIG. 1 is a block diagram showing a basic configuration of a manual-mode operating system for a robot, according to the present invention.

The embodiments of the present invention are described below, in detail, with reference to the accompanying drawings. In the drawings, the same or similar components are denoted by common reference numerals.

Referring to the drawings, FIG. 1 shows, as a block diagram, a basic configuration of a manual-mode operating system for a robot, according to the present invention. The manual-mode operating system 10, according to the present invention, is provided with a display section 16 including a screen 14 for displaying an image of an end-effector 12; a first input section 18 for an input of coordinate system data on the screen 14 of the display section 16, which is displaying the image of the end-effector 12, the coordinate system data designating a manual-mode coordinate system used for describing an orientation of the end-effector 12; a coordinate system setting section 20 for setting the manual-mode coordinate system at a spatial position corresponding to an input position on the screen 14 of the display section 16, on the basis of the coordinate system data input through the first input section 18; a second input section 22 for an input of orientation data using the manual-mode coordinate system set through the coordinate system setting section 20, the orientation data instructing the orientation of the end-effector 12; and an orientation adjusting section 24 for adjusting the orientation of the end-effector 12 on the basis of the orientation data input through the second input section 22.

According to the manual-mode operating system 10 having the above-described configuration, it is possible for an operator to input, on the screen 14, the coordinate system data for designating the manual-mode operating system while visually confirming the image of the end-effector 12 displayed on the screen 14 of the display section 16. Therefore, it is possible to readily and accurately execute the adjustment of the orientation of the end-effector 12, without requiring an operator's skill, for an actual robot as well as for a simulation robot.

Figure 2A:
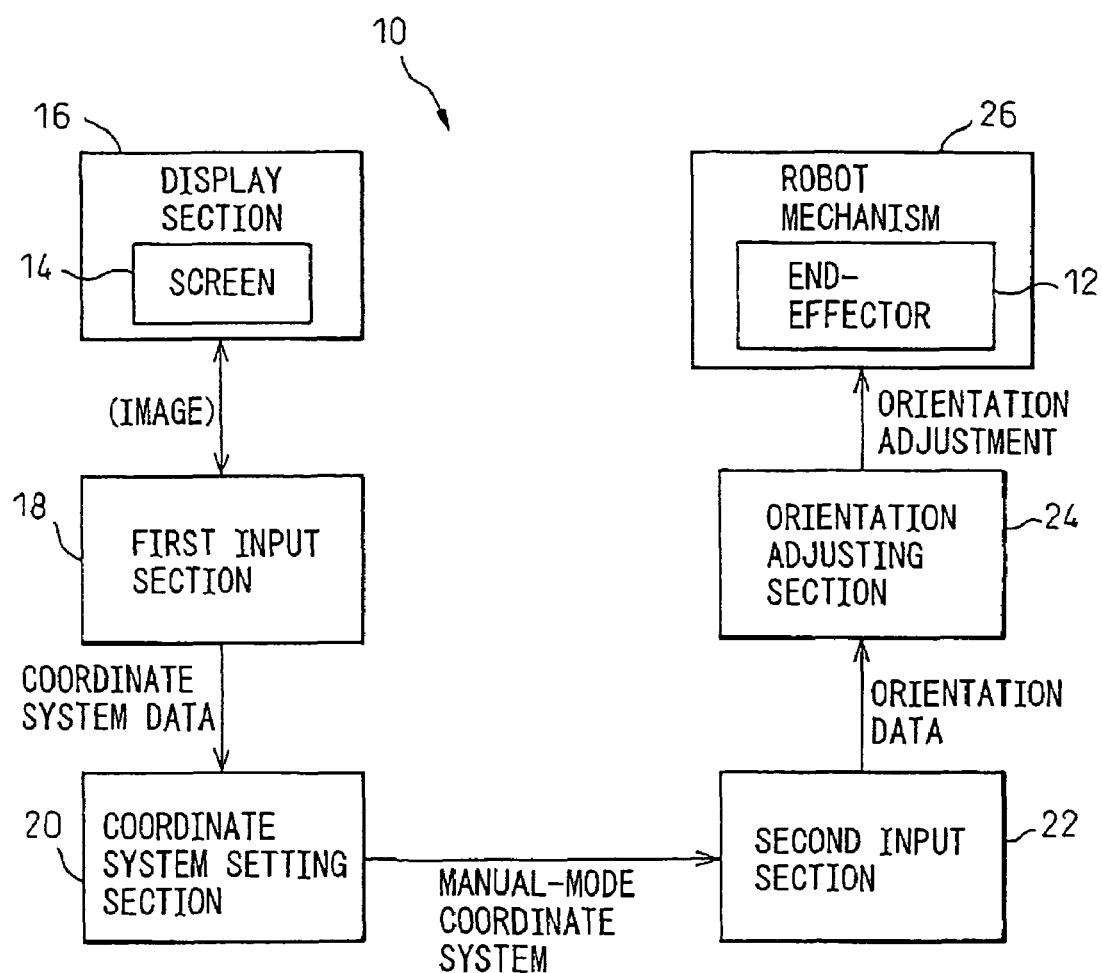

FIGS. 2A and 2B respectively show, as block diagrams, preferred aspects of the manual-mode operating system 10 having the above basic configuration. As shown in FIG. 2A, the manual-mode operating system 10 may include a robot mechanism 26 including said end-effector 12. Also, in this arrangement, the orientation adjusting section 24 may control an actual motion of the robot mechanism 26 in a manual mode, to adjust an actual orientation of the end-effector 12, on the basis of the orientation data input through the second input section 22. This aspect is directed for the adjustment of the orientation of the end-effector 12 for an actual robot.

Alternatively, as shown in FIG. 2B, the manual-mode operating system 10 may include a data processor 28 provided with the orientation adjusting section 24. Also, in this arrangement, the orientation adjusting section 24 may adjust the orientation of the end-effector 12 represented as the image displayed on the screen 14 of the display section 16, on the basis of the orientation data input through the second input section 22. This aspect is directed for the adjustment of the orientation of the end-effector 12 for a simulation robot.

FIG. 3 typically shows a configuration of a manual-mode operating system according to one embodiment of the present invention. This embodiment relates to the manual-mode operating system 10 for an actual robot, as shown in FIG. 2A, so that the corresponding components are denoted by common reference numerals and the descriptions thereof are not repeated. In this embodiment, a robot controller 30 controls the operations of respective control axes provided in the robot mechanism 26. A movable hand 12 is attached, as the end-effector 12, to the distal end of an arm of the robot mechanism 26. The opening or closing action of the hand 12 is executed through the operation of an additional control axis (e.g., the seventh axis in a six-axis robot). In this arrangement, the robot controller 30 controls the operation of the additional control axis so as to make the hand 12 open or close, and recognizes the existing condition of the hand 12 (i.e., the existing position of the additional control axis) as occasion demands.

Figure 4:
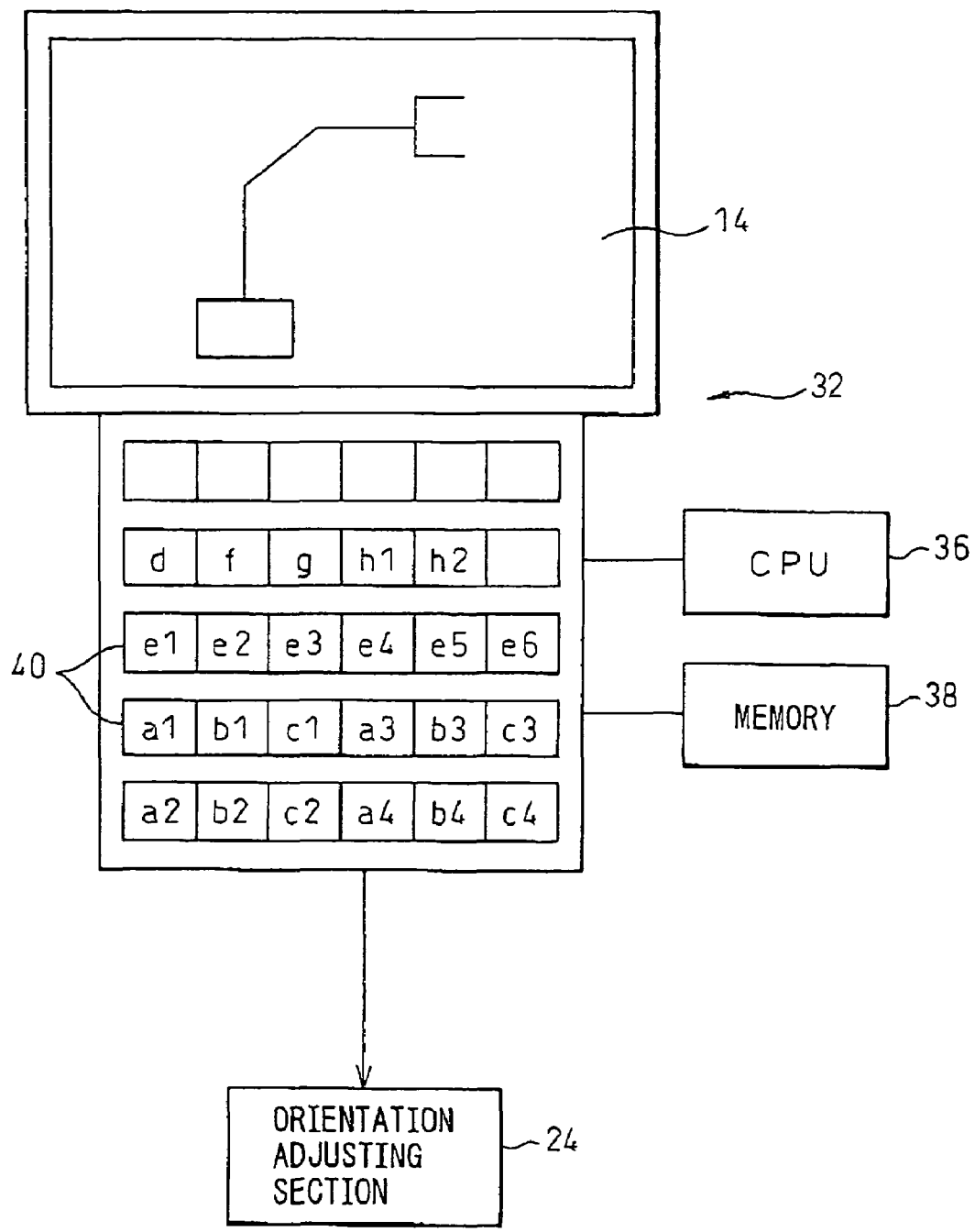
FIG. 4 is a schematic plan view showing a teaching unit used in the embodiment of FIG. 3.

The robot controller 30 is further connected with a teaching unit 32 and peripheral equipment 34 through respective interfaces (not shown). As shown in FIG. 4, the teaching unit 32 includes electronic parts incorporated therein, such as a CPU 36, a memory (or a storage section) 38, etc., and is also provided with a display screen 14 and various operation keys 40 arranged on the outer surface of a casing. The teaching unit 32 possesses a manual-mode operating function for causing respective control axes of the robot mechanism 26 to operate in a parallel translation or rotation on the designated coordinate system, and the other normal functions, such as the editing or correcting of a program, the entering or correcting position data, and so or. In FIG. 4, the operation keys 40 for the manual mode operation are labeled with symbols "a1" to "a4", "b1" to "b4", and "c1" to "c4". The operation keys 40 for the manual mode operation are individually shiftable between a depressed state (upon being operated) and a non-depressed state (upon being not operated). When the respective keys are maintained in the depressed state, a signal for causing the corresponding one of the following motions, which should be performed in small increments, in the designated coordinate system (the manual-mode coordinate system) is issued to the robot controller 30, and when the respective keys are shifted into the non-depressed state, a signal for stopping the motions at the existing position is issued to the robot controller 30.

Key "a1" . . . Translational motion in +X axis direction
Key "a2" . . . Translational motion in –X axis direction
Key "b1" . . . Translational motion in +Y axis direction
Key "b2" . . . Translational motion in –Y axis direction
Key "c1" . . . Translational motion in +Z axis direction
Key "c2" . . . Translational motion in –Z axis direction
Key "a3" . . . Normal Rotational motion about X axis
Key "a4" . . . Reverse Rotational motion about X axis
Key "b3" . . . Normal Rotational motion about Y axis
Key "b4" . . . Reverse Rotational motion about Y axis
Key "c3" . . . Normal Rotational motion about Z axis
Key "c4" . . . Reverse Rotational motion about Z axis.

The peripheral equipment 34 includes, for example, a workpiece transfer device or a machine tool, and sends a signal indicating an existing condition (e.g., a workpiece transfer position, the opening or closing state of a workpiece entrance door in a machine tool, etc.) as an I/O signal to the robot controller 30, in response to a request signal from the robot controller 30.

In the manual-mode operating system according to the illustrated embodiment, the orientation adjusting section 24 (FIG. 2A) is provided in the robot controller 30, and the teaching unit 32 is connected to the orientation adjusting section 24. Also, the display section 16, the first input section 18 and the second input section 22 are provided in the teaching unit 32. Further, the coordinate system setting section 20 (FIG. 2A) is provided in the CPU 36 of the teaching unit 32.

The teaching unit 32 is switched into "an existing condition displaying mode" by, for example, depressing the key "d". In the existing condition displaying mode, the CPU 36 receives data indicating the existing conditions of the robot mechanism 26, the hand 12 and the peripheral equipment 34 from the robot controller 30 repeatedly, at a sufficiently short period, and stores the data in the memory 38. On the other hand, the shape data and layout data of the robot mechanism 26, the hand 12 and the peripheral equipment 34, prepared by, for example, an off-line programming unit possessing a motion simulating function, are previously stored in the memory 38 of the teaching unit 32. Then, the CPU 36 executes the operation for displaying an image, in the form of a three-dimensional (3D) graphic, showing the existing condition of a working environment including the robot mechanism 26, the hand 12 and the peripheral equipment 34 on the screen 14, on the basis of the shape data, layout data and existing condition data (generally referred to as working environment data, in this application) of the robot mechanism 26, the hand 12 and the peripheral equipment 34 (i.e., the function of the display section 16).

An operator can freely select the viewing direction or angle of the 3D display on the screen 14 of the teaching unit 32 by using, for example, the keys "e1" to "e6" of the teaching unit 32. Then, when the operator designates a desired setting position of "a manual-mode coordinate system" on the screen 14 graphically displaying the existing condition and depresses, e.g., the key "f" (a manual-mode coordinate system setting key), it is possible to automatically set the manual-mode coordinate system with the origin coordinate thereof located at the designated position (i.e., the functions of the first input section 18 and the coordinate system setting section 20). The flow of the entire procedure of a manual-mode operating process will be described with reference to FIG. 5, together with the explanations of an example of the display screen 14, an example of the designating step of the manual-mode coordinate system, a process after designation, and so on.

First, at step S1, the key "d" of the teaching unit 32 is depressed to enter the existing condition display mode, so as to display a 3D graphic image on the screen 14. The displayed image includes at least an image representing the existing condition of the hand 12. To this end, the CPU 36 receives the existing position data of the robot mechanism 26 and the open/close position data of the hand 12 (or the position data of the additional axis) from the robot controller 30, and calculates a region occupied by the hand 12 in a layout space by using the received data as well as the layout data of the robot mechanism 26 and the shape data of the hand 12, both stored in the memory 38. Based on the results of the calculation, the 3D displaying of the hand 12 is carried out through the display section 16 (FIG. 2A).

Also, as occasion demands, the existing conditions of the robot mechanism 26, the peripheral equipment 34, a workpiece, etc. are displayed in the form of 3D graphics together with the hand 12. In order to display the robot mechanism 26, the CPU 36 uses the existing position data of the robot mechanism 26 received from the robot controller 30 for displaying the hand 12 as well as the shape data and layout data of the robot mechanism 26 previously stored in the memory 38. Based on these data, the region occupied by the robot mechanism 26 in the layout space is calculated. On the basis of the result of this calculation, the 3D-displaying of the robot mechanism 26 (for the whole or part of it) is carried out.

In order to display the peripheral equipment 34, the CPU 36 receives data representing the existing condition of the peripheral equipment 34 from the robot controller 30, and determines a display content on the basis of the received data and the shape data of the peripheral equipment 34 previously stored in the memory 38 (see an example described later).

Also, for example, if it is required that a condition where a workpiece is gripped by the hand 12 is displayed on the screen 14, the shape data of the workpiece in the form of an appendix or inclusion of the shape data of the hand 12 as well as the correlation in position and orientation between the hand 12 and the workpiece in the gripped condition should be previously stored in the memory 38 of the teaching unit 32. The CPU 36 uses these data and executes the operation for 3D-displaying the image of the workpiece gripped by the hand 12 (see an example described later).

Further, for example, if the peripheral equipment 34 is a transfer device (e.g., a machined-workpiece forwarding section of a machine tool) for transferring the workpiece placed on a workpiece support toward a hand grippable position, the position of the workpiece is determined by the existing condition of the peripheral equipment 34. Therefore, the CPU 36 uses the existing condition data of the peripheral equipment 34 and the shape data of the workpiece, so as to execute the operation for 3D-displaying the existing position of the workpiece on the screen 14.

Next, at step S2, a user (or an operator) designates a position (or a point) on the screen 14, which is desired as the origin of a manual-mode operating system. The position to be designated can be selected by, for example, shifting a pointer mark on the screen 14 to the desired point by operating an operation key 40 and thereafter depressing the manual-mode coordinate system setting key "f" (i.e., the coordinate system data input function of the first input section 18). Alternatively, it is possible to provide the screen 14 with a touch panel function, and thus for the operator to shift the pointer toward the desired point by touching a pen-like touch tool to the desired point. In this manner, the origin coordinate data of the manual-mode coordinate system desired by the user can be input.

Next, at step S3, the CPU 36 of the teaching unit 32 calculates the three-dimensional position coordinate of the origin of the manual-mode coordinate system corresponding to the designated point, under the designation of the origin position on the screen 14. Then, at step S4, the CPU 36 receives data for determining the orientation of the manual-mode coordinate system (i.e., the directions of X, Y and Z axes) from the robot controller 30, and sets the manual-mode coordinate system having the origin as the three-dimensional position calculated at step S3 (i.e., the manual-mode coordinate system setting function of the coordinate system setting section 20). The origin coordinate data of the set manual-mode coordinate system and the data representing the directions of the respective coordinate axes are stored in the memory 38 of the teaching unit 32, and also are issued to the robot controller 30. At the same time, the CPU 36 executes the operation for displaying a coordinate image, showing the origin position the respective coordinate axes directions of the manual-mode coordinate system, on the screen 14.

In this connection, the shape data and layout data of the robot mechanism 26, the hand 12, the peripheral equipment 34, the workpiece, etc., may also be previously stored in a memory (not shown) of the robot controller 30. In this arrangement, the CPU 36 of the teaching unit 32 may transfer the two-dimensional coordinate data of the designated point to the robot controller 30 upon receiving the designation of the origin position on the screen 14, and then the CPU (not shown) of the robot controller 30 may calculate the three-dimensional position coordinate of the origin of the manual-mode coordinate system corresponding to the designated point so as to set the manual-mode coordinate system (i.e., the function of the coordinate system setting section 20).

It should be noted that the orientation of the manual-mode coordinate system can be determined in any suitable way. For example, it is possible to determine the orientation of the manual-mode coordinate system in such a manner as to coincide with the orientation of a currently valid tool coordinate system or the orientation of a world coordinate system previously set in a robot. In this arrangement, the CPU 36 of the teaching unit 32 (or the CPU of the robot controller 30) executes a process for setting the manual-mode coordinate system, including a coordinate axis parallel to a coordinate axis of another coordinate system previously set for describing the position and orientation of the robot, on the basis of the origin coordinate data input on the screen 14. Alternatively, the orientation may be determined by relating a specific coordinate axis (e.g., the Z axis) to the orientation, etc. of the surface of an object corresponding to a geometrical image designated on the screen 14, as described later.

Lastly, at step S5, the operator uses, in a suitable and necessary way, the operation keys 40 ("a3", "a4", "b3", "b4", "c3", "c4") of the teaching unit 32, so as to input orientation data for instructing the orientation of the hand 12 in the manual-mode coordinate system as set (i.e., the orientation data inputting function of the second input section 22). Then, the CPU 36 sends the orientation data to the robot controller 30, and the robot controller 30 controls the operation of the robot mechanism 26 on the basis of the orientation data, so as to adjust the orientation of the hand 12 by rotational motions about three axes X, Y, Z in the manual-mode coordinate system (i.e., the function of the orientation adjusting section 24). In this connection, the center point of the orientation adjusting motion of the hand 12 coincides with the position of the origin of the manual-mode coordinate system as set at step S4. If it is desired to change the center point of the orientation adjusting motion, a setting clear key "g" of the teaching unit 32 (see FIG. 4) is depressed, for example, to clear the present setting, and thereafter the step S2 and the steps subsequent thereto are again executed.

In the above process flow, the teaching unit 32 (or the display section 16) displays, in real time, the shifting or moving state of the hand 12 on the screen 14 during a period when the orientation of the hand is adjusted by the robot controller 30 (or the orientation adjusting section 24). In this connection, the conditions of the environment of the hand 12 (e.g., the distal end of the arm of the robot mechanism 26) and of the peripheral equipment 34 are also displayed in real time on the screen 14, and it is thus possible to confirm the shifting or moving state of the peripheral equipment 34.

Further, in the case where the origin of the manual-mode coordinate system is set on the hand 12, the position of the origin of the set manual-mode coordinate system could be displaced relative to the hand 12 when the hand 12 acts for opening or closing by operating, for example, the key "h1" (a hand open key) or the key "h2" (a hand close key) of the teaching unit 32. Therefore, it is desirable to permit the origin position of the manual-mode coordinate system to be automatically corrected in response to the opening or closing action of the hand 12. In other words, it is advantageous that, in the case where the end-effector 12 is provide with a movable portion and the coordinate system data designating the manual-mode coordinate system is input on the image of the movable portion displayed on the screen 14 of the display section 16, the coordinate system setting section 20 changes the coordinate system data in correspondence to the actual motion of the movable portion and sets the manual-mode coordinate system on the basis of the coordinate system data as changed.

The process flow executed by the coordinate system setting section 20 (or the CPU 36 of the teaching unit 32) having the above configuration will be described below with reference to FIG. 6. The illustrated process flow is started just after step S4 in a routine shown in FIG. 5, and repeatedly executed in a predetermined cycle.

First, at step SS1, it is judged whether the origin of the set manual-mode coordinate system is located on the hand 12. If the origin is located on the hand 12, the process proceeds to step SS2, or otherwise, the process is terminated.

Next, at step SS2, data representing the existing position of the hand 12 (or the existing position of the additional control axis) is acquired from the robot controller 30, and is compared with the other existing position data of the hand acquired in a previous processing cycle, so as to judge whether the hand 12 has acted for opening or closing. If the difference is found in relation to the existing position of the hand 12, it is judged that the hand 12 has acted, and thus the process proceeds to step SS3. On the other hand, if the difference is not found in the existing position, step SS2 is executed again in the next processing cycle. In this connection, in the first cycle of processing, it is unconditionally judged that "there is no difference" (i.e., that the hand 12 has not acted), and step SS2 is executed again in the next processing cycle.

Next, at step SS3, the position of the new origin is calculated on the basis of the amount of difference in relation to the existing position of the hand 12, and the current set data of the manual-mode coordinate system is updated. The position of the manual-mode coordinate system displayed on the screen 14 is also changed. Thereafter, steps SS2 and SS3 are repeatedly executed according to the condition of the hand 12. However, if the setting clear key "g" of the teaching unit 32 is depressed, the process is immediately terminated. At the step S5 in FIG. 5, the orientation adjustment is carried out by using the manual-mode coordinate system as updated in this manner.

The above positional-change procedure for the manual-mode coordinate system, accompanying with the chance in the condition of the end-effector, may also be applied to the configuration in which the end-effector 12 other than the hand 12 is attached to the robot mechanism 26. For example, in the case where the end-effector 12 is a spot welding gun, it is possible to change the position of the origin of the manual-mode coordinate system set on a movable portion of the spot welding gun, in a procedure similar to the above-described procedure. Further, data for clarifying the existing condition of the end-effector 12 is not limited to the existing position data of the additional control axis, but the other data may be used for this purpose. For example, a procedure may be adopted such that the amount of displacement between the opening and closing states of the hand 12 is previously input and the existing condition is judged whether the hand is in the opening state or in the closing state, so that the origin position of the manual-mode coordinate system is changed according to the judged condition.

Figure 7:
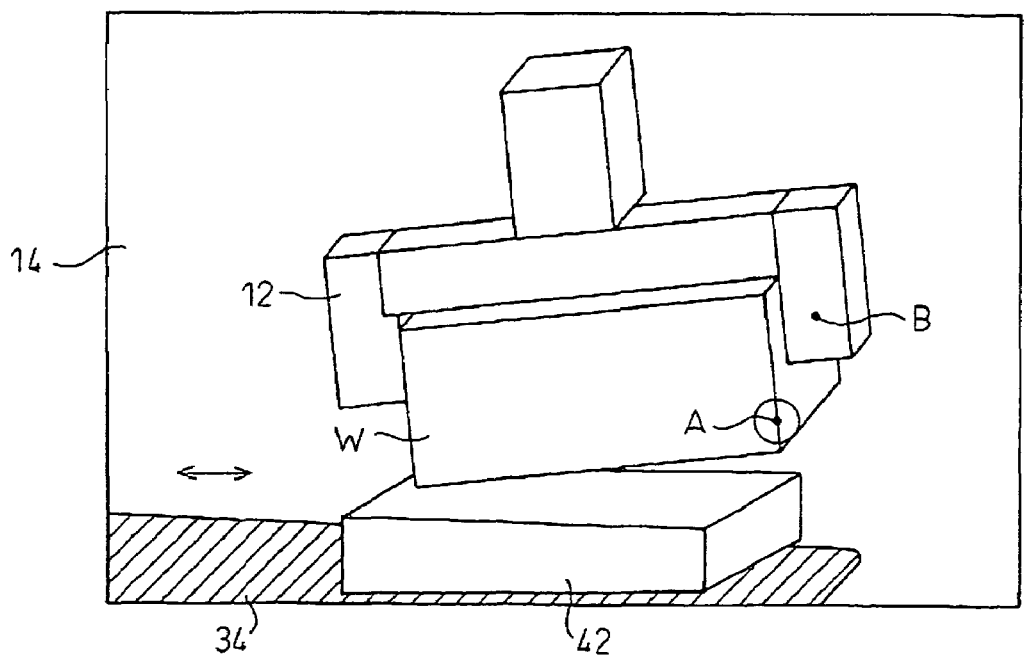
FIG. 7 is an illustration showing one example of coordinate system data input through a screen of a display section.
Figure 8:
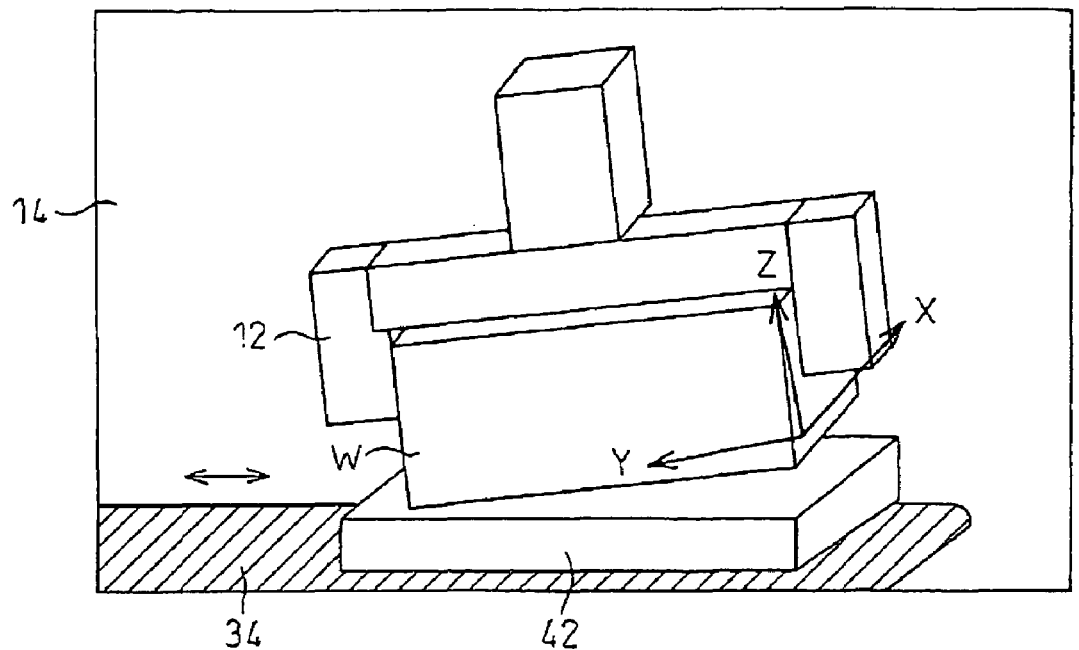
FIG. 8 is an illustration showing a display example of the manual-mode coordinate system set on the basis of the coordinate system data shown in FIG. 7.

Next, one example of the setting procedure of the manual-mode coordinate system, carried out by using the screen 14 of the teaching unit 32, will be described below with reference to FIGS. 7 and 8. Referring to FIG. 7, the 3D image of a working environment displayed on the screen 14 at step S1 of FIG. 5 (i.e., depressing the key "d") and an example of an origin designation for the manual-mode coordinate system (i.e., a picking by a pointer) are illustrated. In the illustrated example, in order to teach the robot a task for placing a workpiece W on a workpiece support 42 transferred to a predetermined position by a transfer device (or the peripheral equipment) 34, the orientation adjustment of the hand 12 is carried out. The image displayed on the screen 14 includes images showing the respective existing positions of the hand 12, the workpiece W gripped by the hand 12, the transfer device (or the peripheral equipment) 34, and the workpiece support 42 clearly representing the existing condition of the transfer device 34.

Figure 5:
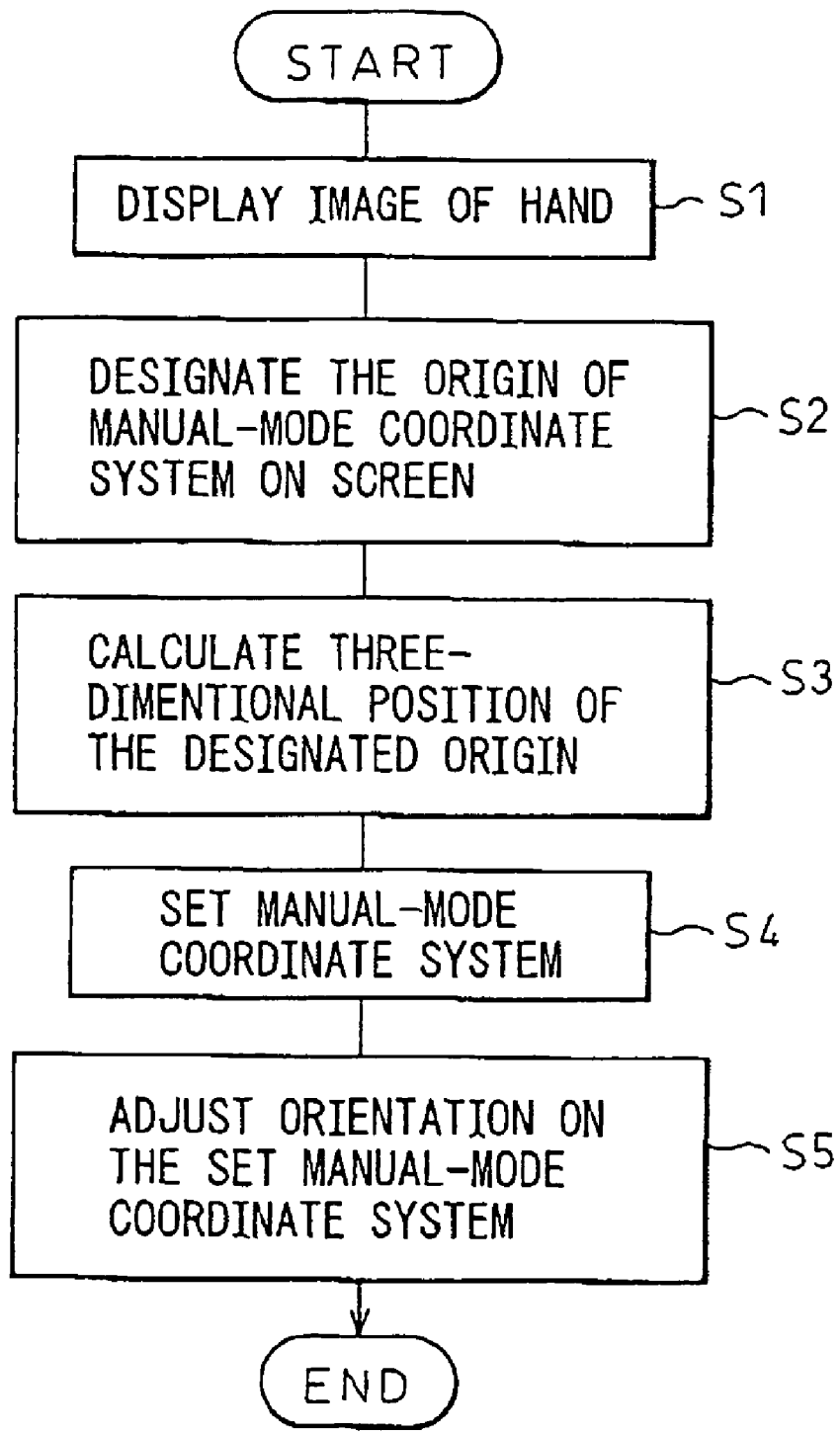
FIG. 5 is a flowchart showing a procedure of a manual mode operation in the embodiment of FIG. 3.
Figure 6:
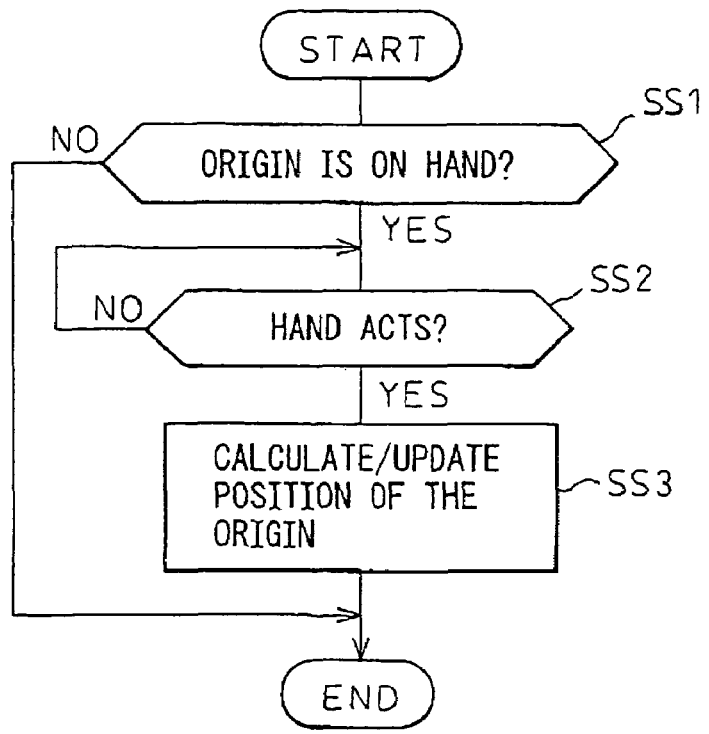
FIG. 6 is a flowchart showing a procedure for correcting origin coordinate data in a manual-mode coordinate system.

While viewing the screen 14, the operator picks, by a pointer, a center point desired during a period when the orientation of the hand 12 is adjusted (step S2 in FIG. 5). It is illustrated that a point A on the workpiece W is picked. Thereupon, steps S3 and S4 in FIG. 5 are executed, and thereby the manual-mode coordinate system with the origin at the point A is determined. As the point A indicates a portion on the workpiece W, the three-dimensional position of the point A is calculated as the position of an intersection between a contour defining a region occupied by the workpiece W and a straight line in the viewing direction of the 3D display that passes through the point A. The result of the determination is sent to the robot controller 30 and, then, the setting of the manual-mode coordinate system is completed. The set manual-mode coordinate system is displayed on the screen 14 in the form of, for example, an image representing a rectangular three axes, as shown in FIG. 8. The determination of the directions of respective coordinate axes is performed in a manner as already described.

Then, the operator uses, in a suitable and necessary way, the operation keys "a3", "a4", "b3", "b4", "c3", "c4" of the teaching unit 32 while viewing the screen 14, so as to carry out the desired orientation adjustment of the hand 12 (step S5 in FIG. 5). The center point in this orientation adjusting motion is the point A. As already described, the condition of the hand 12 and its environment (e.g., the distal end of the arm) changing during the orientation adjustment is displayed in real time on the screen 14. Also, the change in the condition of the peripheral equipment 34, and the opening or closing action of the hand 12, are displayed on the screen 14. Furthermore, in the case where the origin B (FIG. 7) of the manual-mode coordinate system has been set on the hand 12, the position of the origin of the manual-mode coordinate system will be automatically corrected through the previously described steps SS1 to SS3 when the hand 12 acts to open or close.

There are other ways to designate the origin of the manual-mode coordinate system. One example thereof will be described with reference to FIGS. 7 and 8. In the illustrated example, the 3D position of the origin of the manual-mode coordinate system is determined by point designations in two different directions.

Figure 9:
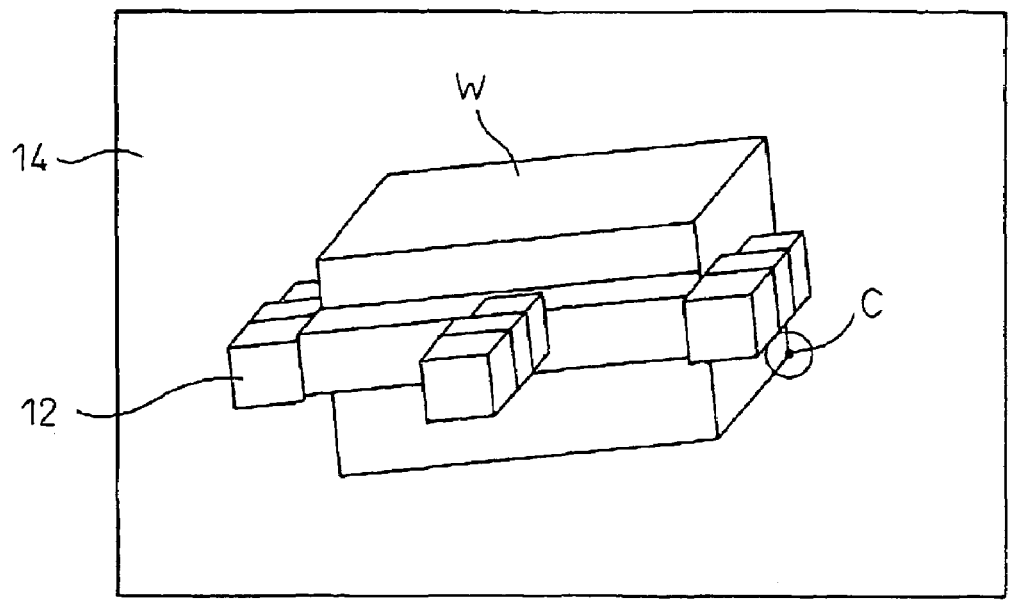
FIG. 9 is an illustration showing another example of coordinate system data input through a screen of a display section.
Figure 10:
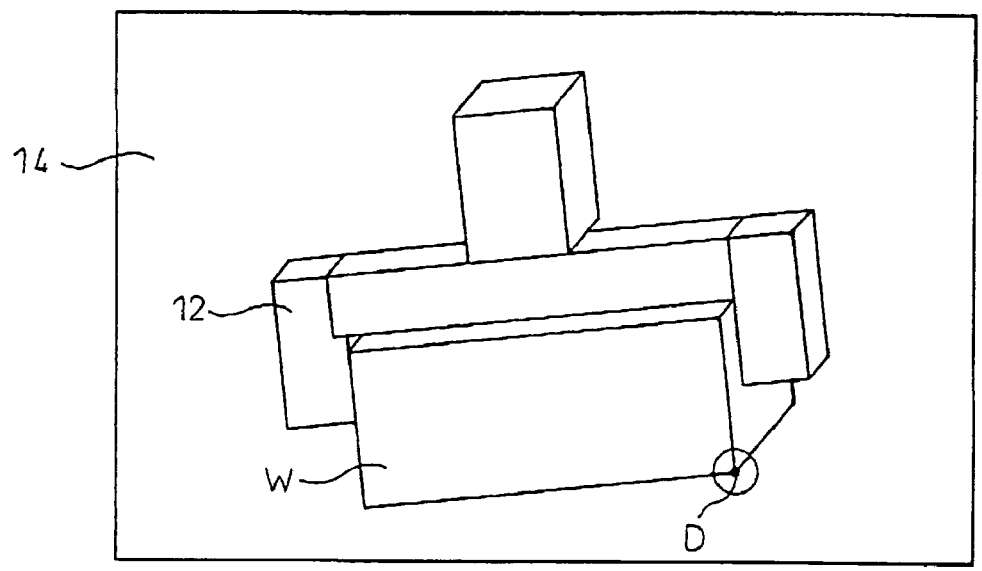
FIG. 10 is an illustration showing a further example of coordinate system data input through a screen of a display section.
Figure 11:
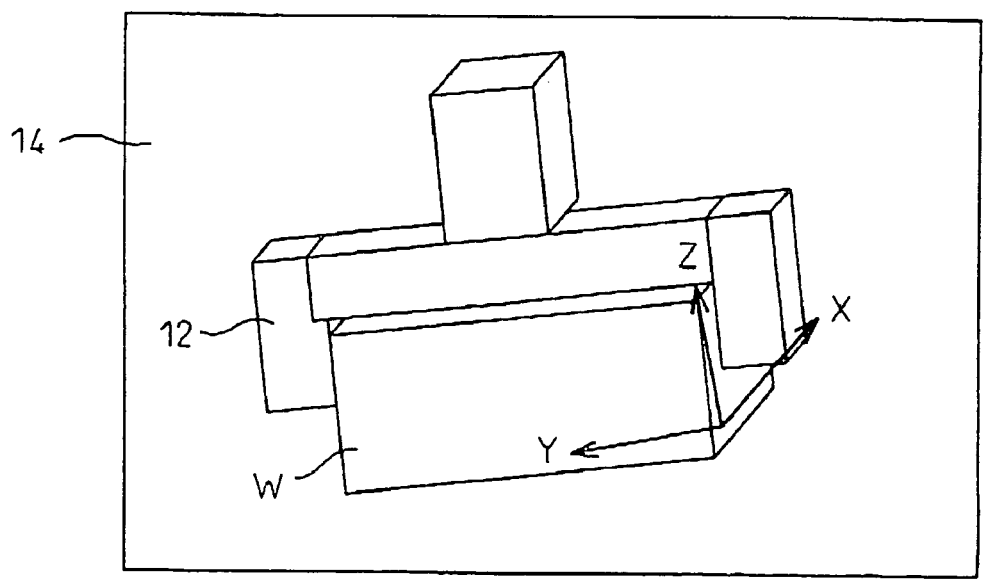
FIG. 11 is an illustration showing a display example of the manual-mode coordinate system set on the basis of the coordinate system data shown in FIGS. 9 and 10.

First, the viewing direction of the 3D display on the screen 14 is conformed to a direction of one coordinate axis of a desired one of various coordinate systems defined in a layout space (e.g., a world coordinate system previously set in the robot) by, for example, appropriately operating the keys "e1" to "e6" of the teaching unit 32, so as to display a graphical image. In FIG. 9, the image is displayed in the 3D way as viewed from a +Z axis direction. Then, the desired point C is designated on the image shown in FIG. 9. As a result of this, the X and Y coordinates of the position of the origin of the manual-mode coordinate system are determined. Next, the image as displayed is changed to the 3D image as viewed from the +X axis direction, as shown in FIG. 10, and the desired point D is designated on the image in FIG. 10. As a result of this, the Z coordinate of the position of the origin of the manual-mode coordinate system is determined. In this way, the three-dimensional position of the origin of the manual-mode coordinate system is surely determined, and the manual-mode coordinate system is set in accordance with the already described procedure and is displayed on the screen as exemplarily shown in FIG. 11. This origin designation procedure based on the point designations in two different directions may be preferably applied to the case where the desired origin is located at a position not easily visible on the screen 14, or to the case where the desired origin is located in midair at which no object is displayed (e.g., an intermediate point between the left and right grasping parts of the hand 12).

Figure 12:
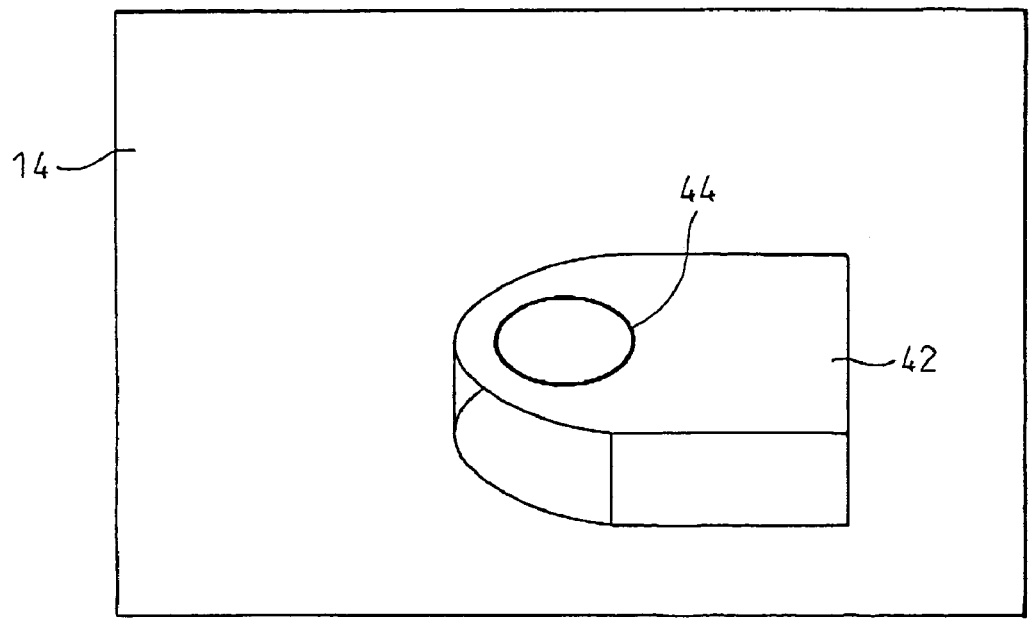
FIG. 12 is an illustration showing a yet further example of coordinate system data input through a screen of a display section.
Figure 13:
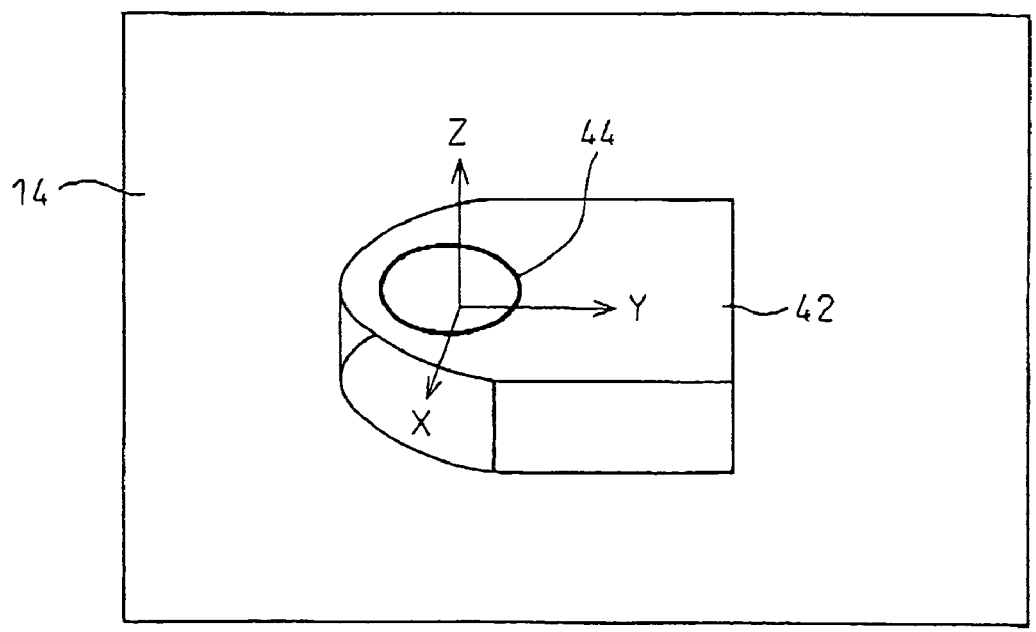
FIG. 13 is an illustration showing a display example of the manual-mode coordinate system set on the basis of the coordinate system data shown in FIG. 12.

Another example of the origin designation of the manual-mode coordinate system will be described with reference to FIGS. 12 and 13. In the illustrated example, instead of directly designating the origin of the manual-mode coordinate system on the screen 14, a desired diagram (i.e., an area surrounded by a graphic line) or diagram part (i.e., a graphic line or point) in the displayed image is designated and the origin coordinate is determined in accordance with a predetermined rule. In FIG. 12, a circular arc 44 in the 3D image is illustrated to be designated on the screen 14. The area surrounded by the circular arc 44 in FIG. 12 represents, for example, a hole formed in the workpiece support 42 and, in such a case as to teach the task of inserting a rod-like workpiece (not shown) gripped by the hand into this hole, the circular arc 44 or the surrounded area thereof (i.e., the hole) is picked by the pointer. Then, the CPU 36 of the teaching unit 32 calculates the three-dimensional position of, for example, the center point of the circular arc 44, and identifies the calculated position with the origin position of the manual-mode coordinate system.

In the above example, the orientation or axis-direction of the manual-mode coordinate system is determined in such a manner that, for example, the +Z axis direction conforms to a direction perpendicular to a three-dimensional plane defined by the circular arc 44 and coincides with a direction of a +Z axis of one basic or common coordinate system predetermined in a layout space (hereinafter referred to as a layout coordinate system). However, if a normal line on the plane defined by the circular arc 44 is parallel to the XY plane of the layout coordinate system, the axis-direction of the manual-mode coordinate system is determined so that the +Z axis direction conforms to a direction of a +X axis of the layout coordinate system. If the orientation of the manual-mode coordinate system still cannot be determined, then the axis-direction is determined so that the +Z axis direction conforms to a direction of a +Y axis of the layout coordinate system. On the other hand, the +X axis direction of the manual-mode coordinate system may be determined so that, for example, the projection of the +X axis thereof on the XY plane of the layout coordinate system coincides with the +X axis of the layout coordinate system. When the +Z axis direction and the +X axis direction have been determined in this way, the manual-mode coordinate system, which is a right-handed rectangular coordinate system, is uniquely determined. FIG. 13 shows a display example of the manual-mode coordinate system as set in this procedure.

In the above procedure, the "face" of an object (or an image), surrounded by a closed curve, may be designated, instead of designating the closed curve such as the circular arc. When the "face" is designated, the position of the center of gravity of a contour diagram encircling the "face", for example, is identified with the origin of the manual-mode coordinate system. The determination of the orientation or axis-direction of the coordinate system may be performed in the same manner as in the above-described example of the circular arc. Alternatively, "a line segment", having distinct opposed ends, of an object (or an image) may be designated. In this case, for example, the midpoint of the designated "line segment" may be identified with the origin of the manual-mode coordinate system. The determination of the orientation of the coordinate system may be performed by, for example, making it conform to the orientation of the tool coordinate system as currently set.

In any event, in the case where the coordinate system data, input through the teaching unit 32, includes data of a geometrical image implying an input position on the screen 14 of the display section 16, the coordinate system setting section 20 (or the CPU 36) may set the manual-mode coordinate system so as to coincide with a coordinate system previously set in association with the geometrical image, on the basis of the data of the geometrical image as input.

In the manual-mode operating system according to the present invention, a data processor, such as a personal computer, may be used to perform the calculations, etc. necessary for displaying images, in addition to the configuration of the embodiment shown in FIG. 3. The configuration of a manual-mode operating system according to such an alternative embodiment of the present invention will be described below with reference to FIG. 14. The embodiment shown in FIG. 14 relates, similarly to the embodiment of FIG. 3, to the manual-mode operating system 10 for an actual robot, as shown in FIG. 2A, so that the corresponding components are denoted by common reference numerals and the descriptions thereof are not repeated. In the embodiment shown in FIG. 14, a robot controller 30 controls the operations of respective control axes provided in the robot mechanism 26 as well as the operation of a movable hand (or the end-effector) 12 attached to the distal end of an arm.

The robot controller 30 is connected to a personal computer 46, in addition to the robot mechanism 26, a teaching unit 32 and peripheral equipment 34. The teaching unit 32 has a basic configuration generally identical to that used in the embodiment of FIG. 3, but there is a certain difference in relation to the storing, handling, calculations, etc. of the data associating with the 3D graphic display. More specifically, in the system configuration shown in FIG. 14, the coordinate system setting section 20 (FIG. 2A), performing the storing, handling, calculations, etc. of the data associating with the 3D graphic display, is provided in the personal computer 46. The personal computer 46 performs the setting of the manual-mode coordinate system in a procedure according to a flowchart shown in FIG. 15, as described below.

First, when the key "d" of the teaching unit 32 is depressed, for example, the depressed state is transmitted to the personal computer 46 via the robot controller 30. Then, at step T1, the personal computer 46 acquires existing condition data, representing the existing position of the robot mechanism 26, the existing condition of the peripheral equipment 34, the acting state of the hand 12 (i.e., the existing position of the additional axis), etc., from the robot controller 30, and stores them into a memory or storage section (not shown).

Next, at step T2, the personal computer 46 creates a signal representing a 3D graphic image including at least the image of the hand 12, based on the shape data, layout data, etc. of the robot mechanism 26, hand 12, peripheral equipment 34, workpiece, etc., previously stored in the memory, as well as on the data received from the robot controller 30 at step T1.

Next, at step T3, the personal computer 46 transfers the signal representing the 3D graphic image, created at step T2, to the teaching unit 32 via the robot controller 30, so as to enable the teaching unit 32 to display the 3D graphic image including the image of the hand 12 on the screen 14. The image displayed in this way is similar to that described in relation to the embodiment of FIG. 3. In this connection, the personal computer 46 may also execute the 3D graphic display on its own screen by using the signal of the 3D graphic image.

Next, at step T4, the origin of the manual-mode coordinate system (or the center point for the orientation adjusting motion of the hand 12) is designated in the same manner as described in the embodiment of FIG. 3. Then, at step T5, the personal computer 46 acquires the data of the origin designated at step T4 from the teaching unit 32 via the robot controller 30. At step T6, the CPU of the personal computer 46, receiving the origin data, calculates the three-dimensional position of the designated origin. The calculation is performed in a way as described in relation to the embodiment of FIG. 3.

Next, at step T7, the personal computer 46 receives data for determining the orientation of the manual-mode coordinate system (or the directions of X, Y and Z axes) from the robot controller 30, and sets the manual-mode coordinate system with the origin located at the three-dimensional position (or the center position for the orientation adjustment) calculated at step T6. Data indicating the origin position and respective coordinate-axis directions of the manual-mode coordinate system as set are transmitted to the teaching unit 32, as well as to the robot controller 30, and the set manual-mode coordinate system is displayed on the screen 14 as shown in, for example, FIG. 8.

When the manual-mode coordinate system has been set in this way, the operator uses, in a suitable and necessary way, the operation keys "a3", "a4", "b3", "b4", "c3", "c4" of the teaching unit 32, at step T8, so as to carry out the desired orientation adjustment of the hand 12. The center point in this orientation adjusting motion is the origin of the set manual-mode coordinate system. If it is desired to change the center point of the orientation adjusting motion, a setting clear key "g" of the teaching unit 32 (see FIG. 4) is depressed, for example, and thereafter the step T1 and the steps subsequent thereto are again executed. During this procedure, the teaching unit 32 also displays, in real time, the existing orientation of the hand 12, the existing condition of the peripheral equipment 34, etc. on the screen 14, in the same way as the embodiment of FIG. 3. However, the necessary calculations and the creation of the display data based thereon are performed by the personal computer 46, and the results are transferred to the teaching unit 32 so as to be used for producing a graphic display on the screen 14.

The designation of the position of the origin of the manual-mode coordinate system and the setting of the coordinate system (steps T4 to T7) may also be accomplished in other ways, such as the point designations from two different directions and the coordinate system setting based thereon (see FIGS. 9 to 11), or the diagram or diagram-part designation and the coordinate system setting based thereon (see FIGS. 12 and 13), as already described. Further, the origin can also be corrected in association with the opening or closing action of the hand. However, the necessary calculations and the creation of the display data based thereon are performed by the personal computer 46, not in the teaching unit 32, and the data representing the display content is transferred via the robot controller 30 to the teaching unit 32 so as to be used for producing a display on the screen 14.

Figure 14:
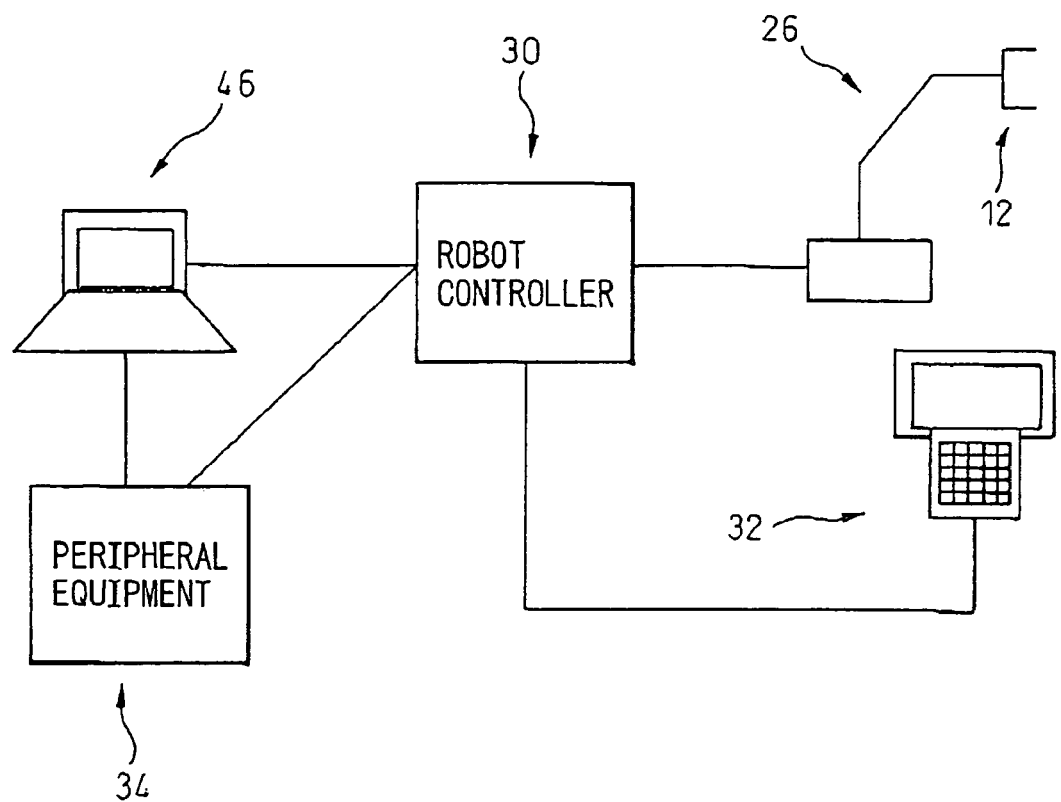
FIG. 14 is an illustration typically showing a configuration of a manual-mode operating system according to another embodiment of the present invention.
Figure 15:
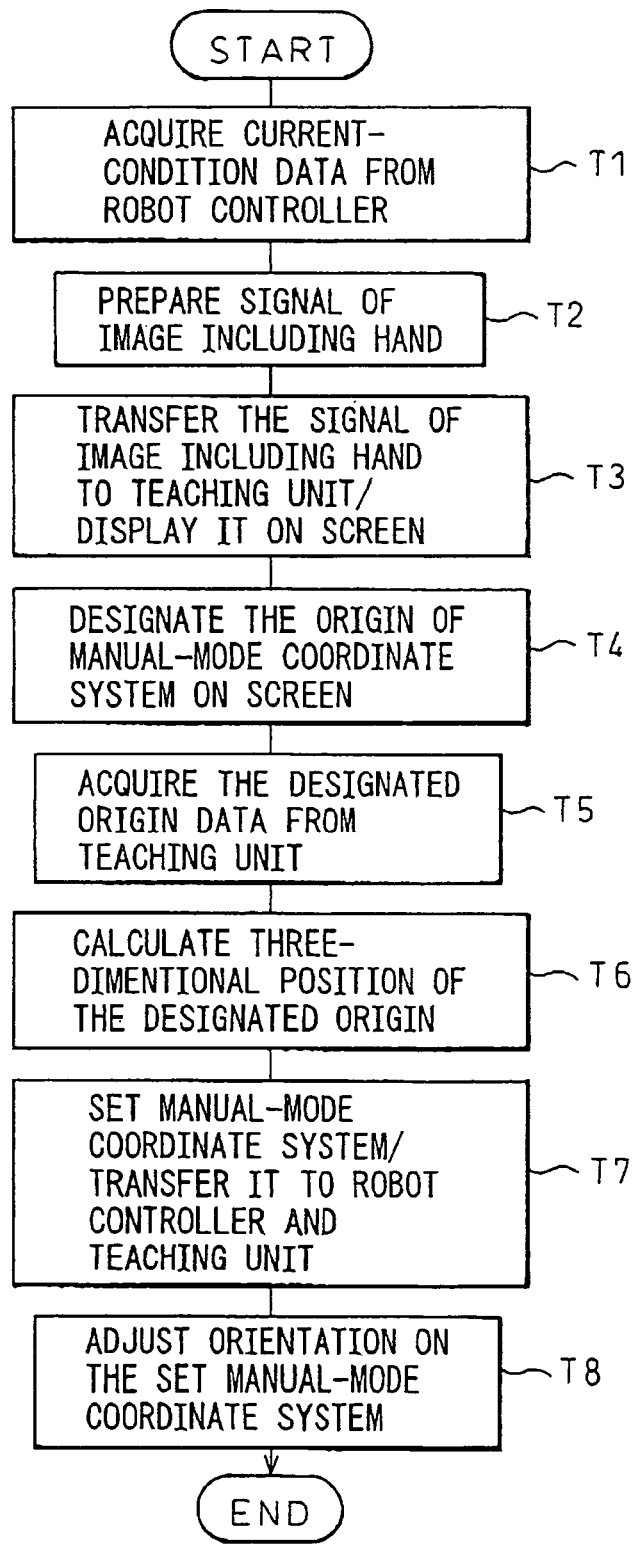
FIG. 15 is a flowchart showing a procedure of a manual mode operation in the embodiment of FIG. 14.
Figure 16:
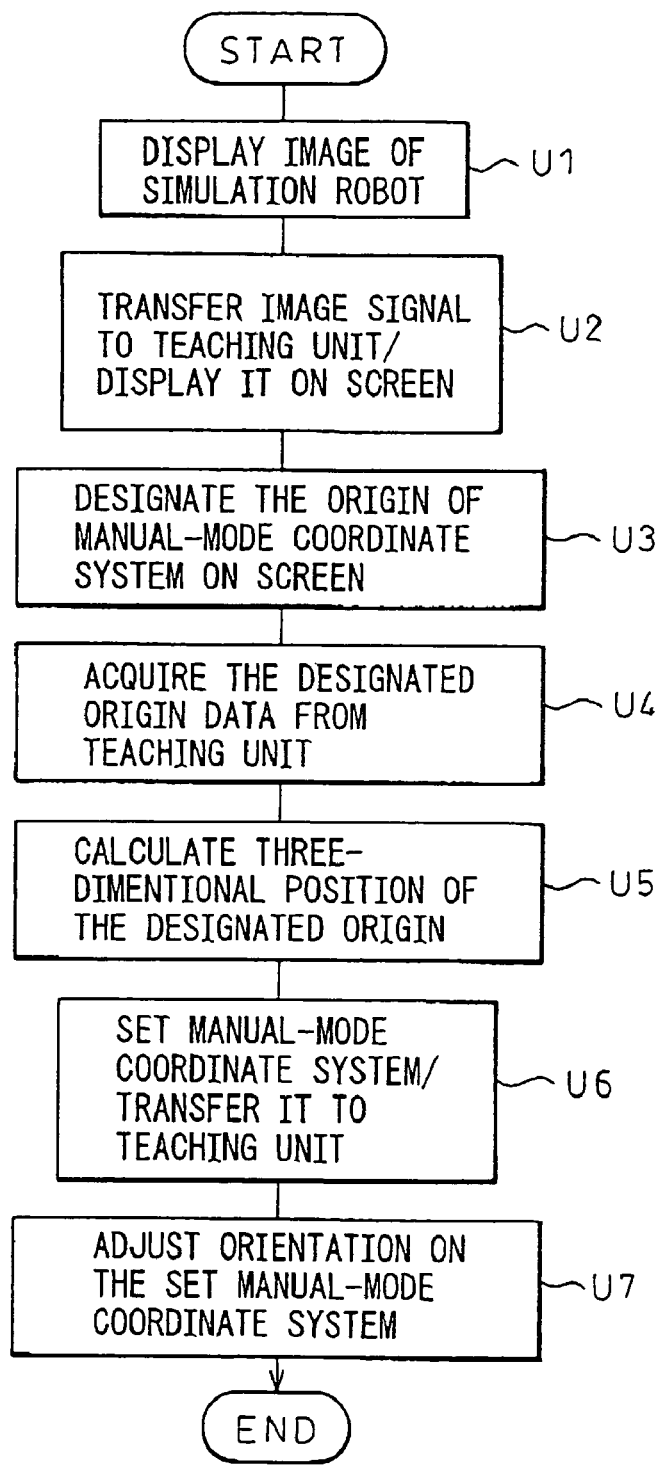
FIG. 16 is a flowchart showing a procedure of a manual mode operation in a manual-mode operating system according to a further embodiment of the present invention.

Further, in the system configuration shown in FIG. 14, the robot mechanism 26 and the robot controller 30 of the actual robot may be separated from the system, and the personal computer 46 having the function of an off-line simulation device may be adopted. In this embodiment, the teaching unit 32 is directly connected to the personal computer 46 (or alternatively, the robot controller 30 is used exclusively for a data transfer), so that a simulation robot provided in the personal computer 46, not the actual robot, is operated (i.e., operated on the screen) by the operation of the teaching unit 32. The embodiment shown in FIG. 16 relates to the manual-mode operating system 10 for a simulation robot, as shown in FIG. 2B, so that the corresponding components are denoted by common reference numerals and the descriptions thereof are not repeated. The process flow of the personal computer 46 in the manual-mode operating system 10 for the simulation robot will be described below with reference to FIG. 16.

First, when the key "d" of the teaching unit 32 is depressed, the depressed state is transmitted to the personal computer 46. Then, at step U1, the personal computer 46 displays a condition just before the simulation robot previously provided for a simulating operation adjusts the orientation of an end-effector (e.g., an imaginary hand 12), on the screen of the personal computer 46 in itself, in the form of a 3D graphic image, together with the image of the end-effector and/or the image of peripheral equipment. In this connection, if the position and/or orientation of the simulation robot as displayed is inappropriate, the teaching unit 32 is operated in a manual mode to correct the position and/or orientation of the simulation robot so as to be appropriate, just before the orientation adjustment. As for the coordinate system for this manual mode operation, a world coordinate system or a tool coordinate system, previously set on a simulation system, may be designated.

Next, at step U2, the personal computer 46 transfers a signal indicating the above image to the teaching unit 32, and executes the operation for displaying the 3D graphic image including the image of the end-effector on the screen 14 of the teaching unit 32. The image as displayed in this way is similar to the one displayed in the embodiment of FIG. 3.

Next, at step U3, the origin of the manual-mode coordinate system (or the center point for the orientation adjusting motion of the end-effector) is designated in the same manner as described in the embodiment of FIG. 3. Then, at step U4, the personal computer 46 acquires the data of the origin designated at step U3 from the teaching unit 32. At step U5, the CPU of the personal computer 46, after acquiring the origin data, calculates the three-dimensional position of the designated origin. The calculation is performed in a way described in relation to the embodiment of FIG. 3.

Next, at step U6, the personal computer 46 selects data for determining the orientation of the manual-mode coordinate system (or the directions of X, Y and Z axes) from among data provided for the simulating operation (e.g., selects the orientation of the tool coordinate system), and sets the manual-mode coordinate system with the origin located at the three-dimensional position (or the center position for the orientation adjustment) calculated at step U5. Data indicating the origin position and respective coordinate-axis directions of the manual-mode coordinate system as set are stored in the personal computer 46 and also transmitted to the teaching unit 32, and the set manual-mode coordinate system is displayed on the screen 14 as shown in, for example, FIG. 8.

When the manual-mode coordinate system has been set in this way, the operator uses, in a suitable and necessary way, the operation keys "a3", "a4", "b3", "b4", "c3", "c4" of the teaching unit 32, at step U7, so as to carry out the desired orientation adjustment of the end-effector (such as the imaginary hand 12 attached to the simulation robot). The center point in this orientation adjusting motion is the origin of the set manual-mode coordinate system. If it is desired to change the center point of the orientation adjusting motion, a setting clear key "g" of the teaching unit 32 (see FIG. 4) is depressed, for example, and thereafter the step U1 and the steps subsequent thereto are again executed. During this procedure, the teaching unit 32 also displays, in real time, the existing orientation of the end-effector, the existing condition of the imaginary peripheral equipment 34, etc. on the screen 14, in the same way as the embodiment of FIG. 3. However, the necessary calculations and the creation of the display data based thereon are performed by the personal computer 46, and the results are transferred to the teaching unit 32 so as to be used for producing a graphic display on the screen 14.

The designation of the position of the origin of the manual-mode coordinate system and the setting of the coordinate system (steps U3 to U6) may also be accomplished in other ways, such as the point designations from two different directions and the coordinate system setting based thereon (see FIGS. 9 to 11), or the diagram or diagram-part designation and the coordinate system setting based thereon (see FIGS. 12 and 13), as already described. Further, the origin can also be corrected in association with the opening or closing action of the hand. However, the necessary calculations and the creation of the display data based thereon are performed by the personal computer 46, not in the teaching unit 32, and the data representing the display content is transferred to the teaching unit 32 so as to be used for producing a display on the screen 14.

As will be clearly understood from the above description, according to the present invention, it is possible to properly operate a robot in a manual mode by an operator, and not necessarily a skilled operator. This also makes it possible to reduce a time required for the teaching of the robot system. Furthermore, when the present invention is applied to the manual mode operation of a simulation robot in an off-line programming system, it becomes possible to reduce a time required for the off-line programming.

While the invention has been described with reference to specific preferred embodiments, it will be understood by those skilled in the art that various changes and modifications may be made thereto without departing from the spirit and scope of the following claims.

The invention claimed is:

1. A manual-mode operating system for a robot provided with an end-effector, comprising:
   a display section including a screen for displaying an image of an end-effector;
   a first input section for an input of coordinate system data on said screen of said display section, displaying said image of said end-effector, said coordinate system data designating a manual-mode coordinate system used for describing an orientation of said end-effector;
   a coordinate system setting section for setting said manual-mode coordinate system at a spatial position corresponding to an input position on said screen of said display section, based on said coordinate system data input through said first input section;
   a second input section for an input of orientation data using said manual-mode coordinate system set through said coordinate system setting section, said orientation data instructing said orientation of said end-effector;
   an orientation adjusting section for adjusting said orientation of said end-effector, based on said orientation data input through said second input section; and
   a teaching unit connected to said orientation adjusting section, wherein said display section, said first input section and said second input section are provided in said teaching unit.

2. A manual-mode operating system, as set forth in claim 1, comprising a robot mechanism including said end-effector, wherein said orientation adjusting section controls an actual motion of said robot mechanism in a manual mode, to adjust an actual orientation of said end-effector, based on said orientation data.

3. A manual-mode operating system, as set forth in claim 2, comprising a robot controller for controlling a motion of said robot mechanism, wherein said orientation adjusting section is provided in said robot controller.

4. A manual-mode operating system, as set forth in claim 3, wherein said coordinate system setting section is provided in said robot controller.

5. A manual-mode operating system, as set forth in claim 1, wherein said coordinate system setting section is provided in said teaching unit.

6. A manual-mode operating system, as set forth in claim 1, comprising a data processor connected to said orientation adjusting section, wherein said coordinate system setting section is provided in said data processor.

7. A manual-mode operating system, as set forth in claim 1, comprising a data processor provided with said orientation adjusting section, wherein said orientation adjusting section adjusts said orientation of said end-effector represented as said image displayed on said screen of said display section, based on said orientation data.

8. A manual-mode operating system, as set forth in claim 1, wherein said display section displays said manual-mode coordinate system, set through said coordinate system setting section, on said screen.

9. A manual-mode operating system, as set forth in claim 1, wherein said display section displays a shifting state of said end-effector during a period when said orientation is adjusted by said orientation adjusting section.

10. A manual-mode operating system, as set forth in claim 1, further comprising a storage section for storing working environment data including shape data of said end-effector, wherein said display section acquires said working environment data from said storage section and displays an image of a working environment including said image of said end-effector on said screen.

11. A manual-mode operating system, as set forth in claim 1, wherein said coordinate system data, input through said first input section, includes origin coordinate data of said manual-mode coordinate system, and wherein said coordinate system setting section sets said manual-mode coordinate system, including a coordinate axis parallel to a coordinate axis of another coordinate system previously set for describing position and orientation of the robot, based on said origin coordinate data input through said first input section.

12. A manual-mode operating system, as set forth in claim 1, wherein said coordinate system data, input through said first input section, includes data of a geometrical image implying an input position on said screen of said display section, and wherein said coordinate system setting section sets said manual-mode coordinate system so as to coincide with a coordinate system previously set in association with said geometrical image, based on said data of said geometrical image input through said first input section.

13. A manual-mode operating system, as set forth in claim 1, wherein said end-effector is provide with a movable portion and wherein, when said coordinate system data designating said manual-mode coordinate system is input on an image of said movable portion displayed on said screen of said display section, said coordinate system setting section changes said coordinate system data in correspondence to an actual motion of said movable portion and sets said manual-mode coordinate system, based on said coordinate system data as changed.

* * * * *